US011961448B2

(12) United States Patent
Kim

(10) Patent No.: US 11,961,448 B2
(45) Date of Patent: Apr. 16, 2024

(54) DISPLAY DEVICE

(71) Applicant: Samsung Display Co., Ltd., Yongin-si (KR)

(72) Inventor: Hakgyu Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/954,542

(22) Filed: Sep. 28, 2022

(65) Prior Publication Data

US 2023/0252931 A1 Aug. 10, 2023

(30) Foreign Application Priority Data

Feb. 4, 2022 (KR) ........................ 10-2022-0014808

(51) Int. Cl.
*G09G 3/20* (2006.01)

(52) U.S. Cl.
CPC ... *G09G 3/2092* (2013.01); *G09G 2300/0465* (2013.01)

(58) Field of Classification Search
CPC ..................... G09G 3/2092; G09G 2300/0465
See application file for complete search history.

(56) References Cited

U.S. PATENT DOCUMENTS

| | | | | |
|---|---|---|---|---|
| 2017/0270841 | A1* | 9/2017 | An | G09G 3/3266 |
| 2019/0206331 | A1* | 7/2019 | Lee | G09G 3/3233 |
| 2020/0020303 | A1* | 1/2020 | Kim | G06V 20/41 |
| 2021/0034101 | A1* | 2/2021 | Yildiz | G06F 1/203 |
| 2021/0304677 | A1* | 9/2021 | Yang | G09G 3/2003 |
| 2021/0304703 | A1* | 9/2021 | Xu | G09G 5/003 |

FOREIGN PATENT DOCUMENTS

| | | | |
|---|---|---|---|
| KR | 101084229 | B1 | 11/2011 |
| KR | 1020150041484 | A | 5/2020 |

* cited by examiner

*Primary Examiner* — Matthew A Eason
*Assistant Examiner* — Sujit Shah
(74) *Attorney, Agent, or Firm* — CANTOR COLBURN LLP

(57) ABSTRACT

A display device includes a display panel including pixels, and a display panel driver configured to drive the display panel. The display panel driver is configured to determine a predicted on-pixel ratio of a current frame based on an artificial neural network model and input image data of a previous frame, determine a first adjustment value based on the predicted on-pixel ratio, and adjust a luminance of the current frame based on the first adjustment value.

18 Claims, 8 Drawing Sheets

DISPLAY DEVICE

This application claims priority to Korean Patent Application No. 10-2022-0014808, filed on Feb. 4, 2022 and all the benefits accruing therefrom under 35 U.S.C. § 119, the content of which in its entirety is herein incorporated by reference.

BACKGROUND

1. Field

Embodiments of the present invention relate to a display device. More particularly, embodiments of the present invention relate to a display device adjusting a luminance based on an on-pixel ratio.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

In order to reduce power consumption of the display device, an automatic current limitation ("ACL") method of adjusting a luminance according to an on-pixel ratio ("OPR") of an image displayed on the display device may be used. However, since the current automatic current limitation method adjusts the luminance in the next frame after calculating the on-pixel ratio of one frame, an extreme change in the luminance may be recognized.

SUMMARY

Embodiments of the present invention provide a display device predicting an on-pixel ratio of a current frame based on input image data of a previous frame.

According to embodiments of the present invention, a display device includes: a display panel including pixels, and a display panel driver configured to drive the display panel. The display panel driver is configured to determine a predicted on-pixel ratio of a current frame based on an artificial neural network model and input image data of a previous frame, to determine a first adjustment value based on the predicted on-pixel ratio, and to adjust a luminance of the current frame based on the first adjustment value.

In an embodiment, the artificial neural network model may be corrected based on input image data of each frame.

In an embodiment, the artificial neural network model may be configured to determine the predicted on-pixel ratio as probabilities for on-pixel ratios, and the display panel driver may be configured to determine the first adjustment value based on reference adjustment values according to the on-pixel ratios and the probabilities.

In an embodiment, the display panel driver may be configured to determine the first adjustment value by summing products generated by multiplying the probabilities and the reference adjustment values corresponding to the probabilities, respectively.

In an embodiment, the display panel driver may be configured to reduce the luminance of a first region of the display panel by the first adjustment value, to calculate a first on-pixel ratio of the first region based on input image data of the current frame for the first region, and to reduce the luminance of a second region of the display panel different from the first region by a reference adjustment value corresponding to the first on-pixel ratio.

In an embodiment, the display panel driver may be configured to sequentially display an image in the first region and the second region in the current frame.

In an embodiment, the display panel driver may be configured to calculate a second on-pixel ratio of the first region and a second on-pixel ratio of the second region based on the input image data of the current frame for the first region and the second region, respectively, and to reduce the luminance of a third region of the display panel different from the first region and the second region by a reference adjustment value corresponding to the second on-pixel ratio.

In an embodiment, the display panel driver may be configured to reduce the luminance of a first region of the display panel by the first adjustment value, to calculate a first on-pixel ratio of the first region based on input image data of the current frame for the first region, to calculate a first difference value between the first adjustment value and a reference adjustment value corresponding to the first on-pixel ratio, to determine a second adjustment value by summing the first adjustment value with a product of the first difference value and a first coefficient, to reduce the luminance of a second region of the display panel different from the first region by the second adjustment value, to calculate a second on-pixel ratio of the first region and a second on-pixel ratio of the second region based on the input image data of the current frame for the first region and the second region, respectively, to calculate a second difference value between the first adjustment value and the reference adjustment value corresponding to the second on-pixel ratio, to determine a third adjustment value by summing the first adjustment value with a product of the second difference value and a second coefficient, and to reduce the luminance of a third region of the display panel different from the first region and the second region by the third adjustment value.

In an embodiment, the display panel driver sequentially may display an image in the first region, the second region, and the third region in the current frame.

In an embodiment, the second coefficient may be 1 when the third region includes a pixel row in which the image is displayed last in the current frame.

In an embodiment, the first coefficient and the second coefficient may be greater than 0 and less than or equal to 1, and the second coefficient may be greater than the first coefficient.

According to embodiments of the present invention, a display device includes: a display panel including pixels, and a display panel driver configured to drive the display panel, and the display panel driver includes: a first adjustment value look-up table in which a first adjustment value according to input image data of a previous frame and an artificial neural network model, which predicts an on-pixel ratio of a current frame based on the input image data of the previous frame, and the display panel driver is configured to update the first adjustment value look-up table using the artificial neural network model and to adjust a luminance of the current frame based on the first adjustment value.

In an embodiment, the artificial neural network model may be corrected based on input image data of each frame.

In an embodiment, the display panel driver may be configured to reduce the luminance of a first region of the display panel by the first adjustment value, to calculate a first on-pixel ratio of the first region based on input image data of the current frame for the first region, and to reduce the luminance of a second region of the display panel different from the first region by a reference adjustment value corresponding to the first on-pixel ratio.

In an embodiment, the display panel driver may be configured to sequentially display an image in the first region and the second region in the current frame.

In an embodiment, the display panel driver may be configured to calculate a second on-pixel ratio of the first region and a second on-pixel ratio of the second region based on the input image data of the current frame for the first region and the second region, respectively, and to reduce the luminance of a third region of the display panel different from the first region and the second region by a reference adjustment value corresponding to the second on-pixel ratio.

In an embodiment, the display panel driver may be configured to reduce the luminance of a first region of the display panel by the first adjustment value, to calculate a first on-pixel ratio of the first region based on input image data of the current frame for the first region, to calculate a first difference value between the first adjustment value and a reference adjustment value corresponding to the first on-pixel ratio, to determine a second adjustment value by summing the first adjustment value with a product of the first difference value and a first coefficient, to reduce the luminance of a second region of the display panel different from the first region by the second adjustment value, to calculate a second on-pixel ratio of the first region and a second on-pixel ratio of the second region based on the input image data of the current frame for the first region and the second region, respectively, to calculate a second difference value between the first adjustment value and the reference adjustment value corresponding to the second on-pixel ratio, to determine a third adjustment value by summing the first adjustment value and a product of the second difference value and a second coefficient, and to reduce the luminance of a third region of the display panel different from the first region and the second region by the third adjustment value.

In an embodiment, the display panel driver may sequentially display an image in the first region, the second region, and the third region in the current frame.

In an embodiment, the second coefficient may be 1 when the third region includes a pixel row in which the image is displayed last in the current frame.

In an embodiment, the first coefficient and the second coefficient may be greater than 0 and less than or equal to 1, and the second coefficient may be greater than the first coefficient.

Therefore, the display device may predict an on-pixel ratio of a current frame without input image data of the current frame, and may adjust a luminance of the current frame according to a predicted on-pixel ratio by determining the predicted on-pixel ratio of a current frame based on an artificial neural network model and input image data of a previous frame, determining a first adjustment value based on the predicted on-pixel ratio, and adjusting a luminance of the current frame based on the first adjustment value. Accordingly, an extreme luminance change (or display of a high luminance image exceeding a specification of the display panel) caused by a delay according to an on-pixel ratio calculation may be effectively prevented.

In addition, the display device may store values for predicting an on-pixel ratio of a current frame in advance and may adjust a luminance of the current frame based on the stored values by including a first adjustment value look-up table in which a first adjustment value according to input image data of a previous frame and an artificial neural network model predicting the on-pixel ratio of the current frame based on the input image data of the previous frame, updating the first adjustment value look-up table using the artificial neural network model, and adjusting the luminance of the current frame based on the first adjustment value.

However, the effects of the present invention are not limited to the above-described effects, and may be variously expanded without departing from the spirit and scope of the present invention.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the present invention will be explained in detail with reference to the accompanying drawings.

Figure 1:
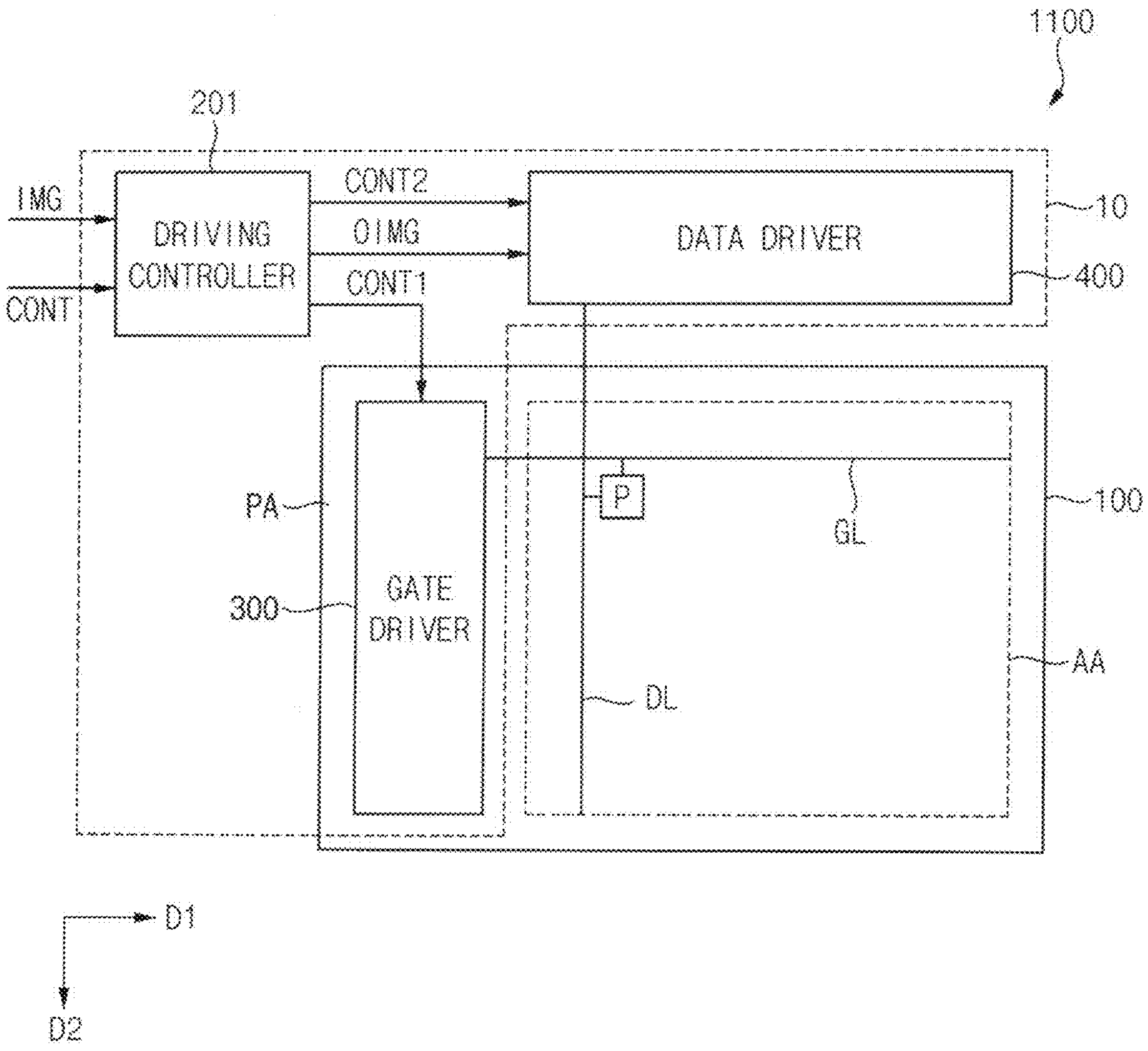
FIG. 1 is a block diagram illustrating a display device according to embodiments of the present invention.

FIG. 1 is a block diagram illustrating a display device 1100 according to embodiments of the present invention.

Referring to FIG. 1, the display device 1100 may include a display panel 100 and a display panel driver 10. The display panel driver 10 may include a driving controller 201, a gate driver 300, and a data driver 400. In an embodiment, the driving controller 201 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 201 may receive input image data IMG and an input control signal CONT from a host processor (e.g., a graphic processing unit; "GPU"). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 201 may generate a first control signal CONT1, a second control signal CONT2, and output image data OIMG based on the input image data IMG and the input control signal CONT.

The driving controller 201 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 201 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 201 may receive the input image data IMG and the input control signal CONT, and generate the output image data OIMG. The driving controller 201 may output the output image data OIMG to the data driver 400.

The gate driver 300 may generate gate signals for driving the gate lines GL in response to the first control signal CONT1 input from the driving controller 201. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 201. The data driver 400 may convert the output image data OIMG into data voltages having an analog type. The data driver 400 may output the data voltage to the data lines DL.

Figure 2:
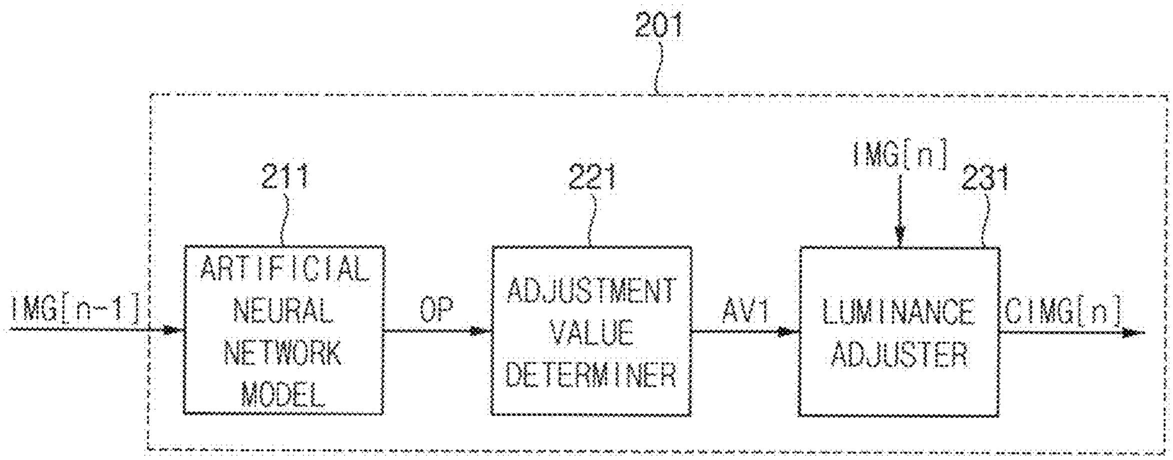
FIG. 2 is a block diagram illustrating an example of a driving controller of the display device of FIG. 1.
Figure 3:
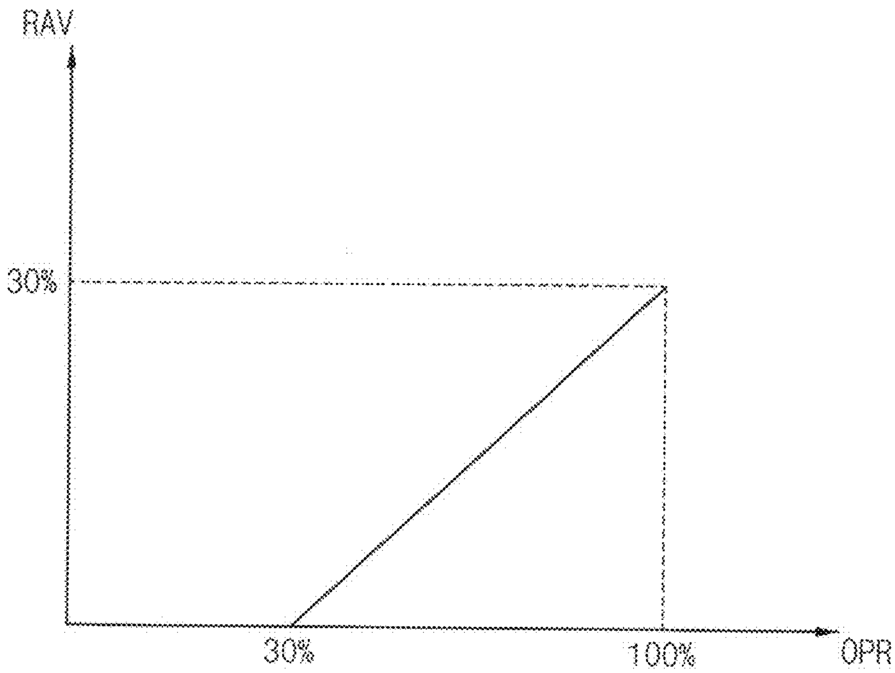
FIG. 3 is a graph illustrating an example of a reference adjustment value.
Figure 4:
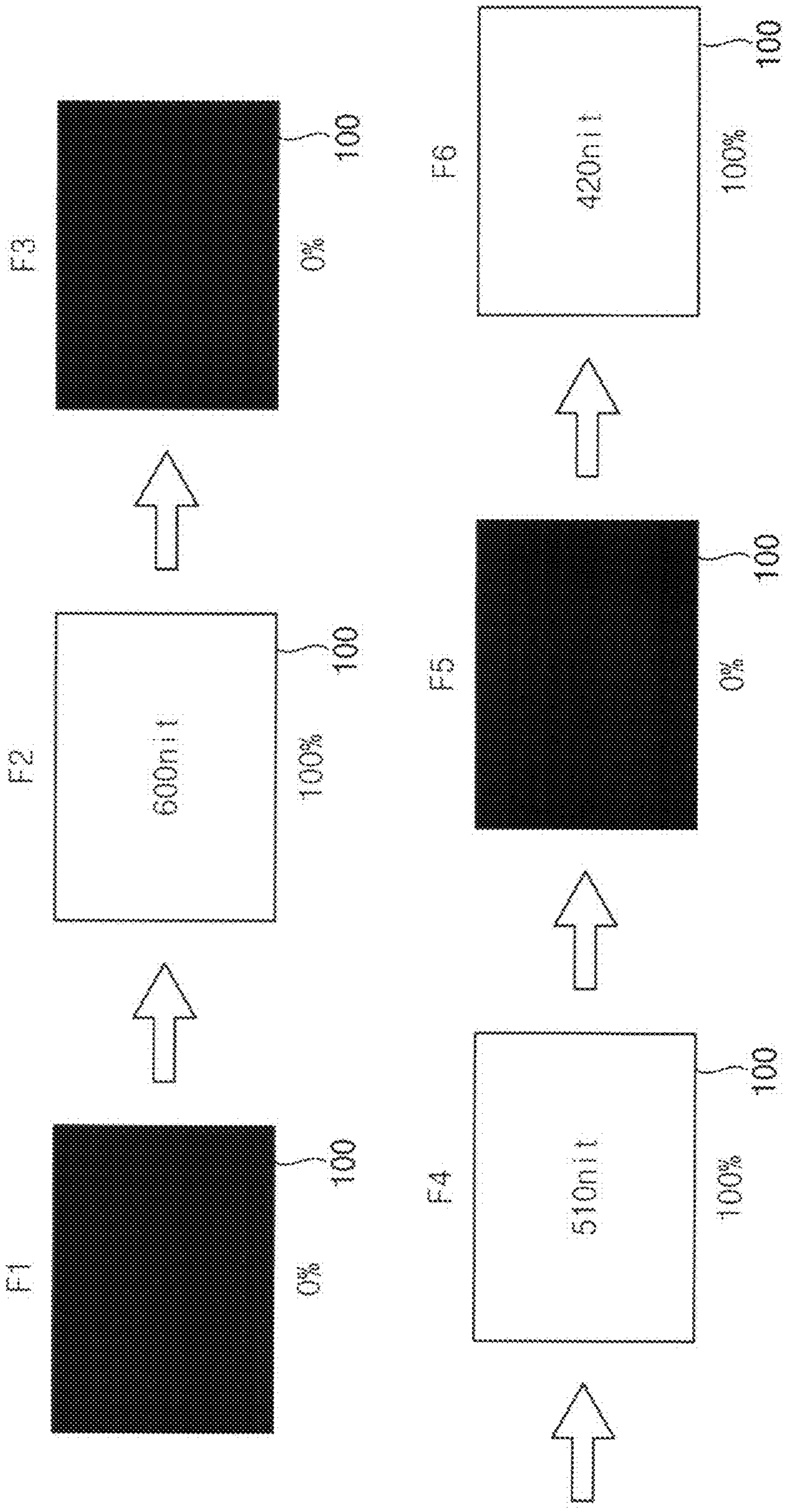
FIG. 4 is a conceptual diagram illustrating an example in which the display device of FIG. 1 adjusts a luminance.

FIG. 2 is a block diagram illustrating an example of the driving controller 201 of the display device 1100 of FIG. 1, FIG. 3 is a graph illustrating an example of a reference adjustment value RAV versus on-pixel ratio OPR, and FIG. 4 is a conceptual diagram illustrating an example in which the display device 1100 of FIG. 1 adjusts a luminance. Hereinafter, it is assumed that the reference adjustment value RAV has the same value as that of FIG. 3.

Referring to FIGS. 1 to 4, the display panel driver 10 (e.g., driving controller 201) may determine a predicted on-pixel ratio OP of a current frame based on an artificial neural network model 211 and input image data IMG[n-1] of a previous frame (where n is a positive integer greater than or equal to 2), determine a first adjustment value AV1 based on the predicted on-pixel ratio OP, and adjust a luminance of the current frame based on the first adjustment value AV1.

The driving controller 201 may include the artificial neural network model 211, an adjustment value determiner 221, and a luminance adjuster 231.

The artificial neural network model 211 may determine the predicted on-pixel ratio OP of the current frame based on the input image data IMG[n-1] of the previous frame. The artificial neural network model 211 may be a model trained to predict from the input image data IMG of one frame or frames the on-pixel ratio of input image data IMG to be applied to a next frame. The artificial neural network model 211 may receive the input image data IMG[n-1] of the previous frame and output the predicted on-pixel ratio OP of the input image data IMG[n] of the current frame. The predicted on-pixel ratio OP may be an on-pixel ratio OPR predicted by the artificial neural network model 211.

The artificial neural network model 211 may be corrected based on the input image data IMG of every frame. The artificial neural network model 211 may be trained to predict the on-pixel ratio OPR by using the on-pixel ratio calculated based on the input image data IMG of each frame. Accordingly, the artificial neural network model 211 may continuously change, and as the display device 1100 is driven, a prediction accuracy of the artificial neural network model 211 may be improved.

In an embodiment, for example, the artificial neural network model 211 may predict the on-pixel ratio OPR of the current frame to be 100% (i.e., a full white image) when a full black image, the full white image, and a full black image are sequentially applied in previous frames. However, the number of frames required for the artificial neural network model 211 to predict the on-pixel ratio OPR is not limited thereto.

The on-pixel ratio OPR is a ratio of a driving amount according to the input image data IMG (i.e., a driving amount when the pixels P are driven based on the input image data IMG) to a maximum driving amount (i.e., the driving amount when all of the pixels P are driven based on a maximum grayscale value). For example, in a case of the full white image (i.e., an image in which 255 grayscale value 255G is displayed in all pixels P), the on-pixel ratio OPR is 100%, and in a case of the full black image (i.e., an image in which 0 grayscale value 0G is displayed in all pixels P), the on-pixel ratio OPR may be 0%.

In an embodiment, the artificial neural network model 211 may determine the predicted on-pixel ratio OP as probabilities for the on-pixel ratios OPR. For example, the artificial neural network model 211 may determine the predicted on-pixel ratio OP for the current frame as 50% probability that the on-pixel ratio OPR is 100% (i.e., full white image), 50% probability that the on-pixel ratio OPR is 50%, and 0% probability that the on-pixel ratio OPR is the remaining value, when the full black image, the full white image, and the full black image are sequentially applied in previous frames.

The adjustment value determiner 221 may determine the first adjustment value AV1 based on the predicted on-pixel ratio OP. In an embodiment, the adjustment value determiner 221 may determine the first adjustment value AV1 based on the reference adjustment values RAV according to the on-pixel ratios OPR and the probabilities (i.e., OP).

The reference adjustment values RAV may be preset values. For example, the reference adjustment value RAV according to the on-pixel ratio OPR of 100% (i.e., full white image) may be 30%, the reference adjustment value RAV according to the on-pixel ratio OPR of 30% may be 0%, the reference adjustment value RAV according to the on-pixel ratios OPR smaller than 30% may be 0%. However, the present invention is not limited thereto. As another example, the reference adjustment values RAV may be the same for all on-pixel ratios OPR. As another example, the reference adjustment value RAV may increase as the on-pixel ratio OPR increases from 0% to 100%.

In an embodiment, the adjustment value determiner 221 may determine the first adjustment value AV1 by summing products generated by multiplying the probabilities (i.e., OP) and the reference adjustment values RAV corresponding to the probabilities, respectively. For example, the reference adjustment values RAV corresponding to the probabilities (i.e., OP) may be the reference adjustment values RAV determined according to the on-pixel ratios OPR for the probabilities, respectively.

In an embodiment, for example, it is assumed that the artificial neural network model 211 determines the predicted on-pixel ratio OP as 50% probability (i.e., ½) that the on-pixel ratio OPR is 100% (i.e., full white image), 50% probability (i.e., ½) that the on-pixel ratio OPR is 0% (i.e., full black image). In this case, the first adjustment value AV1 may be 15% (i.e., 30%*½+0%*½).

The luminance adjuster 231 may correct the input image data IMG[n] of the current frame to decrease the luminance of the current frame by the first adjustment value AV1. The driving controller 201 may generate the output image data OIMG based on the corrected input image data CIMG[n] of the current frame.

In an embodiment, for example, when the first adjustment value AV1 is 30% and the luminance of a displayed image based on the input image data IMG[n] of the current frame without a correction is 600 nit, the luminance of the displayed image based on the corrected input image data CIMG[n] may be reduced by 30%. That is, the luminance of the displayed image based on the corrected input image data CIMG[n] may be 420 nit.

In an embodiment, for example, when the on-pixel ratio OPR of a first frame F1 is 0%, it is assumed that the artificial neural network model 211 may not determine the predicted on-pixel ratio OP of a second frame F2 only with the first frame F1 (or, it is assumed that predicted probabilities (i.e., OP) are lower than a preset reference probability). In this case, the display panel driver 10 may determine the reference adjustment value RAV corresponding to the on-pixel ratio OPR of the first frame F1 as the first adjustment value AV1 of the second frame F2. As another example, in this case, the display panel driver 10 may determine the first adjustment value AV1 to be 0%. Accordingly, the luminance of the second frame F2 may be non-reduced 600 nit (hereinafter, it is assumed that the luminance of the full white image is 600 nit).

In an embodiment, for example, when the on-pixel ratio OPR of the first frame F1 is 0% (i.e., full black image), the on-pixel ratio OPR of the second frame F2 is 100% (i.e., full white image), and the on-pixel ratio OPR of a third frame F3 is 0%, it is assumed that the artificial neural network model 211 may determine the predicted on-pixel ratio OP of a fourth frame F4 as 50% probability (i.e., ½) that the on-pixel ratio OPR is 100%, and 50% probability (i.e., ½) that the on-pixel ratio OPR is 0%. In this case, the first adjustment value AV1 of the fourth frame F4 may be 15% (i.e., 30%*½+0%*½). Accordingly, the luminance of the fourth frame F4 may be reduced to 510 nit (i.e., 600-(600*0.15)).

In an embodiment, for example, when the on-pixel ratio OPR of the first frame F1 is 0%, the on-pixel ratio OPR of the second frame F2 is 100%, the on-pixel ratio OPR of the third frame F3 is 0%, the on-pixel ratio OPR of the fourth frame F4 is 100%, and the on-pixel ratio OPR of the fifth frame F5 is 0%, it is assumed that the artificial neural network model 211 may determine the predicted on-pixel ratio OP of a sixth frame F6 as 100% probability (i.e., 1) that the on-pixel ratio OPR is 100% (i.e., full white image). In this case, the first adjustment value AV1 of the sixth frame F6 may be 30% (i.e., 30%*1). Accordingly, the luminance of the sixth frame F6 may be reduced to 420 nit (i.e., 600-(600*0.3)).

Figure 5:
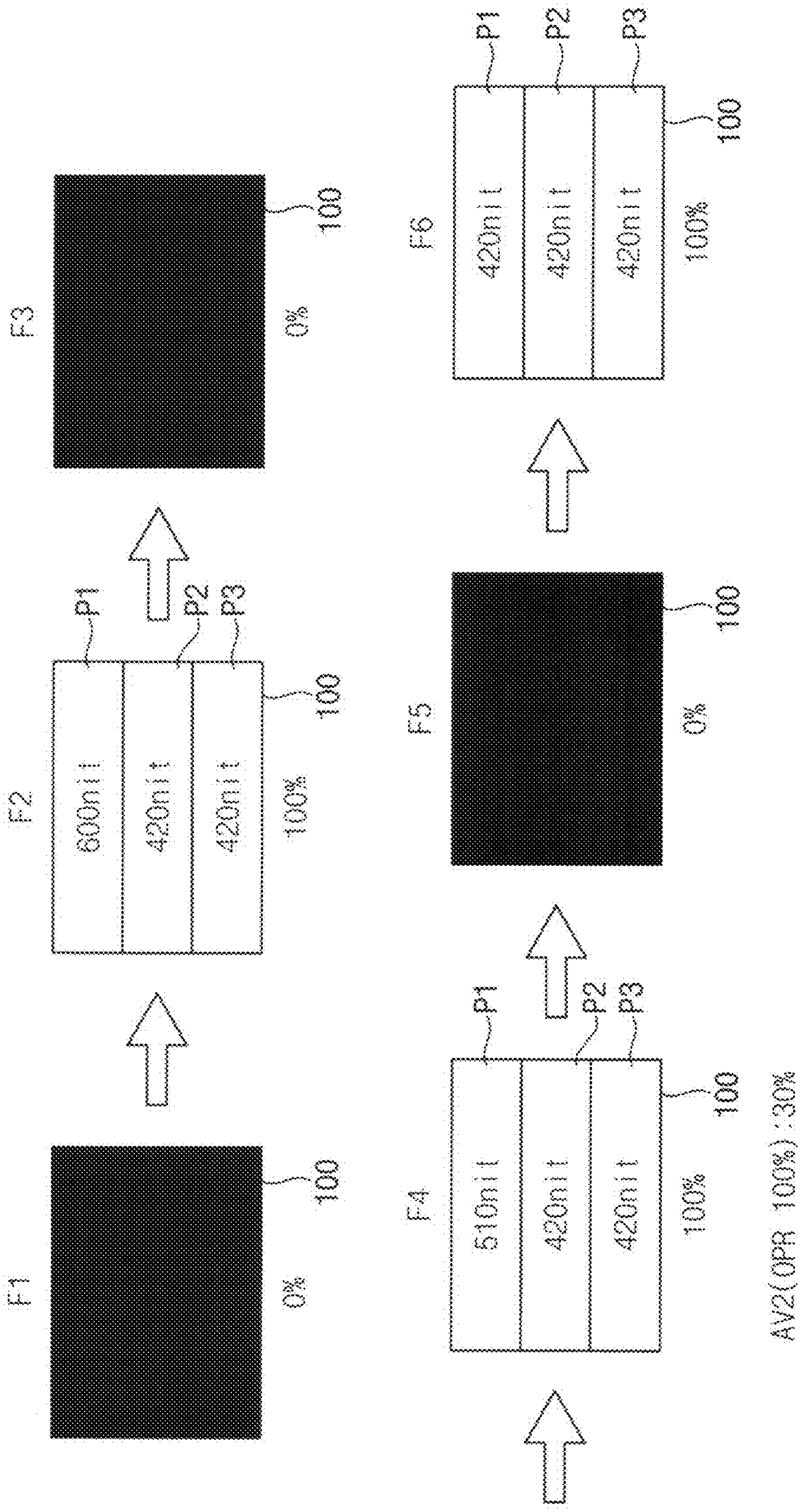
FIG. 5 is a conceptual diagram illustrating an example in which a display device according to embodiments of the present invention adjusts a luminance.

FIG. 5 is a conceptual diagram illustrating an example in which a display device according to embodiments of the present invention adjusts the luminance.

The display device according to the present embodiment is substantially the same as the display device 1100 of FIG. 1 except for adjusting the luminance of a second region P2 and a third region P3. Thus, the same reference numerals are used to refer to the same or similar element, and any repetitive explanation will be omitted.

Referring to FIGS. 2, 3, and 5, the display panel driver 10 may reduce the luminance of a first region P1 of the display panel 100 by the first adjustment value AV1, calculate a first on-pixel ratio of the first region P1 based on the input image data IMG[n] of the current frame for the first region P1, and reduce the luminance of the second region P2 of the display panel 100 different from the first region P1 by a reference adjustment value RAV corresponding to the first on-pixel ratio. The display panel driver 10 may calculate a second on-pixel ratio of the first region P1 and a second on-pixel ratio of the second region P2 based on the input image data IMG[n] of the current frame for the first region P1 and the second region P2, respectively, and reduce the luminance of the third region P3 of the display panel 100 different from the first region P1 and the second region P2 by the reference adjustment value RAV corresponding to the second on-pixel ratio.

The display panel driver 10 may sequentially display an image in the first region P1, the second region P2, and the third region P3 in the current frame. That is, the display panel driver 10 may display the image in the first region P1, display the image in the second region P2, and then displays the image in the third region P3. That is, as shown in FIG. 5, the display panel driver 10 may sequentially display image from an uppermost pixel row. In the display device according to the present embodiment, the display panel 100 is divided into the first region P1, the second region P2, and the third region P3, but the present invention is not limited thereto. In another embodiment, for example, the display device may divide the display panel 100 into four or more, and adjust the luminance for the divided regions differently.

In an embodiment, for example, it is assumed that the first adjustment value AV1 of the second frame F2 is 0%. Since the luminance of the first region P1 of the second frame F2 is reduced by the first adjustment value AV1 (i.e., 0%), the luminance of the first region P1 of the second frame F2 may be 600 nit. Since the on-pixel ratio OPR of the second frame is 100% (i.e., the full white image), the first on-pixel ratio of the first region P1 of the second frame F2 may be 100%. As shown in FIG. 3, since the reference adjustment value RAV corresponding to the on-pixel ratio of 100% is 30%, the luminance of the second region P2 of the second frame F2 may be reduced to 420 nit (i.e., 600-(600*0.3)). Since the on-pixel ratio OPR of the second frame F2 is 100% (i.e., the full white image), the second on-pixel ratio of the first region P1 and the second region P2 of the second frame F2 may be 100%. As shown in FIG. 3, since the reference adjustment value RAV corresponding to the on-pixel ratio of 100% (i.e., full white image) is 30%, the luminance of the third region P3 of the second frame F2 may be reduced to 420 nit (i.e., 600-(600*0.3)).

Accordingly, the display panel driver 10 may adjust the luminance based the predicted on-pixel ratio OP with respect to the first region P1 in which an image is first displayed, and adjust the on-pixel ratio OPR (i.e., the on-pixel ratio OPR for a region in which the image is displayed first) for a region in which the image is displayed later than the first region P1.

Figure 6:
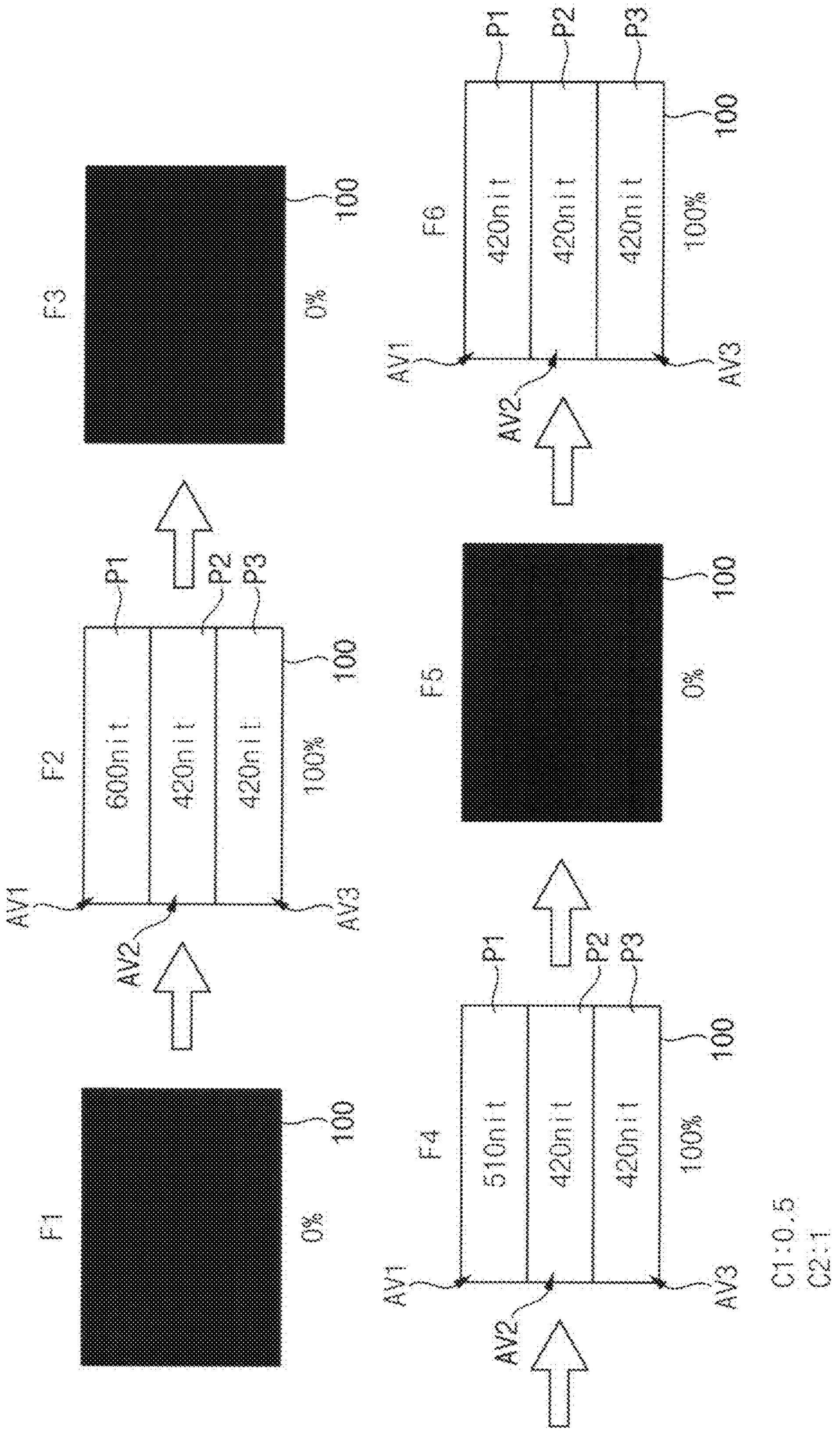
FIG. 6 is a conceptual diagram illustrating an example in which a display device according to embodiments of the present invention adjusts a luminance.

FIG. 6 is a conceptual diagram illustrating an example in which a display device according to embodiments of the present invention adjusts a luminance.

The display device according to the present embodiment is substantially the same as the display device 1100 of FIG. 1 except for adjusting the luminance based on the second adjustment value AV2 and the third adjustment value AV3. Thus, the same reference numerals are used to refer to the same or similar element, and any repetitive explanation will be omitted.

Referring to FIGS. 1, 3, and 6, the display panel driver 10 may calculate a first difference value between the first adjustment value AV1 and the reference adjustment value RAV corresponding to the first on-pixel ratio, determine the second adjustment value AV2 by summing the first adjustment value AV1 with a product of the first difference value and a first coefficient C1, reduce the luminance of the second region P2 of the display panel 100 different from the first region P1 by the second adjustment value AV2, calculate a second difference value between the first adjustment value AV1 and the reference adjustment value RAV corresponding to the second on-pixel ratio, determine the third adjustment value AV3 by summing the first adjustment value AV1 with a product of the second difference value and a second coefficient C2, and reduce the luminance of the third region P3 of the display panel 100 different from the first region P1 and the second region P2 by the third adjustment value AV3. Each of the first coefficient C1 and the second coefficient C2 may be greater than 0 and less than or equal to 1, and the second coefficient C2 may be greater than the first coefficient C1. The second coefficient may be 1 when the third region P3 includes a pixel row in which the image is displayed last in the current frame.

In an embodiment, for example, it is assumed that the first adjustment value AV1 of the second frame F2 is 0%, the first coefficient C1 is 0.5, and the second coefficient C2 is 1. Since the luminance of the second frame F2 for the first region P1 is reduced by the first adjustment value AV1 (i.e., 0%), the luminance of the first region P1 of the second frame F2 may be 600 nit. Since the on-pixel ratio OPR of the second frame F2 is 100% (i.e., the full white image), the first on-pixel ratio of the first region P1 of the second frame F2 may be 100%. As shown in FIG. 3, since the reference adjustment value RAV corresponding to the on-pixel ratio OPR of 100% is 30%, the first difference value may be 30% (i.e., 30-0). Since a product of the first difference value and the first coefficient C1 is 15% (i.e., 30*0.5), the luminance of the second region P2 of the second frame F2 may be reduced to 510 nit (i.e., 600-(600*(0+0.15))). Since the on-pixel ratio OPR of the second frame F2 is 100% (i.e., the full white image), the second on-pixel ratio of the first region P1 and the second region P2 of the second frame F2 may be 100%. As shown in FIG. 3, since the reference adjustment value RAV corresponding to the on-pixel ratio OPR of 100% is 30%, the second difference value may be 30% (i.e., 30-0). Since the third region P3 includes the last pixel row in which an image is displayed (it is assumed that an image is displayed from a top of the display panel 100 in one frame), the second coefficient C2 may be 1. Therefore, since the product of the second difference value and the second coefficient C2 is 30 (i.e., 30*1), the luminance of the third region P3 of the second frame F2 may be reduced to 420 nit (i.e., 600-(600*(0+0.3))). Accordingly, a difference in the luminance between a region (e.g., the first region P1) of the display panel 100 in which the luminance is adjusted based on the input image data IMG[n-1] of the previous frame and a region (e.g., the second region P2 and the third region P3) of the display panel 100 in which the luminance is not adjusted based on the input image data IMG[n-1] of the previous frame may be reduced.

Figure 7:
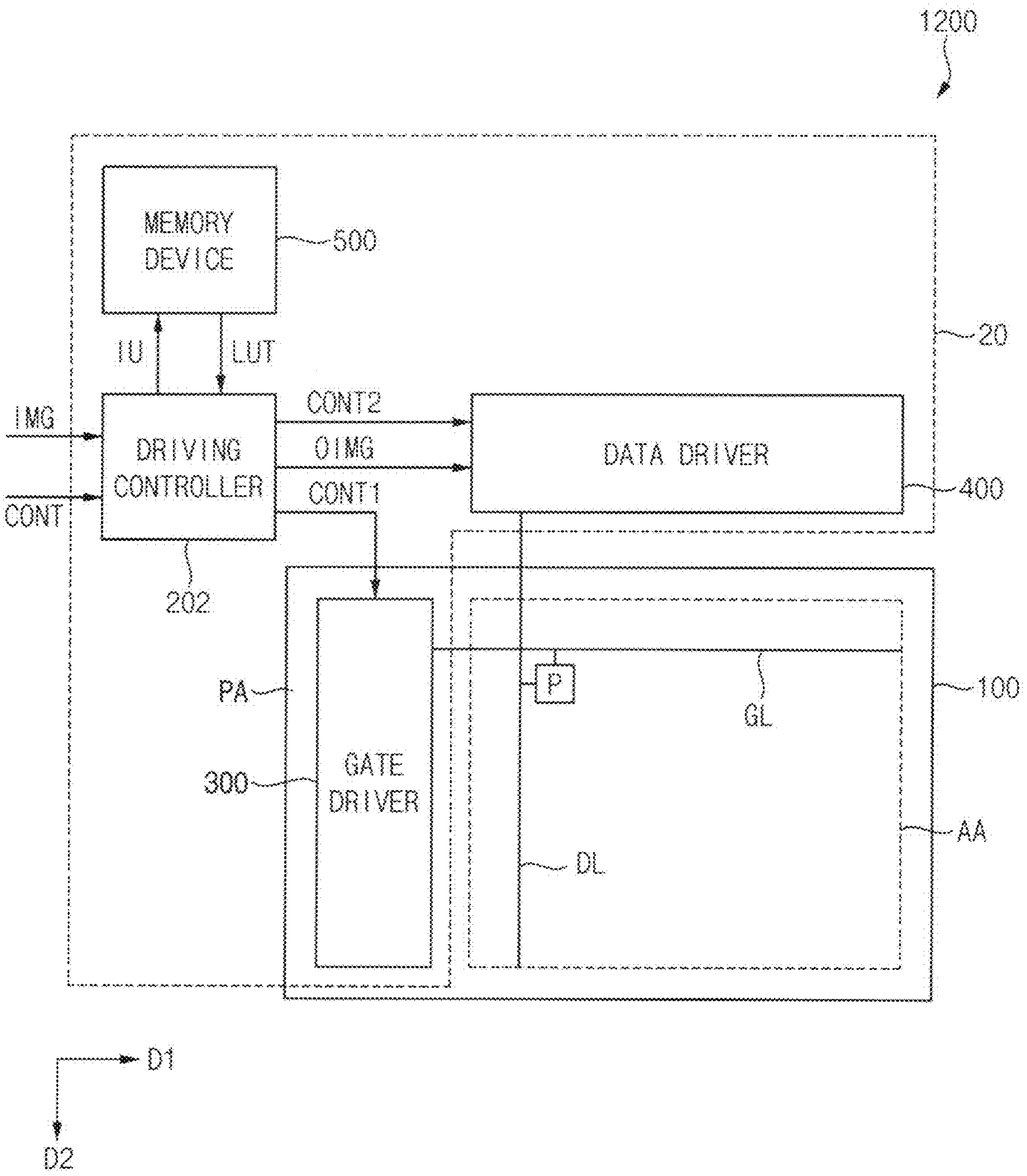
FIG. 7 is a block diagram illustrating a display device according to embodiments of the present invention.
Figure 8:
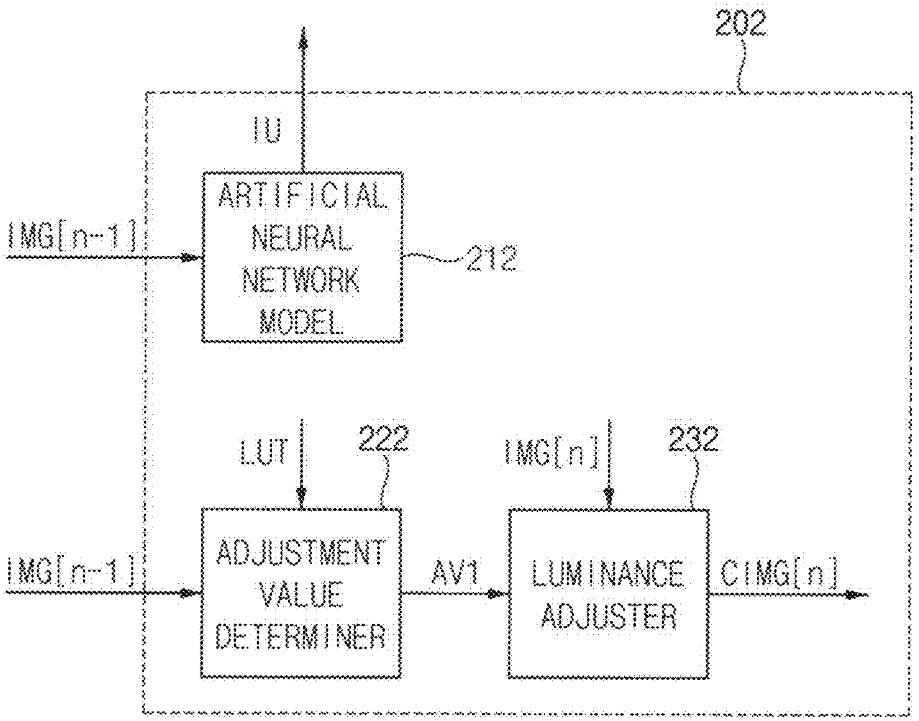
FIG. 8 is a block diagram illustrating an example of a driving controller of the display device of FIG. 7.

FIG. 7 is a block diagram illustrating a display device 1200 according to embodiments of the present invention, and FIG. 8 is a block diagram illustrating an example of a driving controller 202 of the display device 1200 of FIG. 7.

The display device according to the present embodiment is substantially the same as the display device 1100 of FIG. 1 except for modules for determining the first adjustment value AV1. Thus, the same reference numerals are used to refer to the same or similar element, and any repetitive explanation will be omitted.

Referring to FIGS. 3, 7, and 8, the display panel driver 20 may include a first adjustment value look-up table LUT in which the first adjustment value AV1 according to the input image data IMG[n-1] of the previous frame and the artificial neural network model 212 for predicting the on-pixel ratio OPR of the current frame based on the input image data IMG[n-1] of the previous frame, update the first adjustment value look-up table LUT using the artificial neural network model 212, and adjust the luminance of the current frame based on the first adjustment value AV1. In an embodiment, the first adjustment value look-up table LUT may be included in the an adjustment value determiner 222 or a memory device 500.

The driving controller 202 may include the artificial neural network model 212, the adjustment value determiner 222, and a luminance adjuster 232.

The artificial neural network model 212 may predict the on-pixel ratio OPR of the current frame based on the input image data IMG[n-1] of the previous frame. The artificial neural network model 212 may be a model trained to predict from the input image data IMG of one frame or frames on-pixel ratio of the input image data IMG to be applied to a next frame. The artificial neural network model 212 may receive the input image data IMG[n-1] of the previous frame and output the predicted on-pixel ratio OP. The predicted on-pixel ratio OP may be an on-pixel ratio OPR predicted by the artificial neural network model 212. The artificial neural network model 212 may be corrected based on the input image data IMG of every frame. The artificial neural network model 212 may be trained to predict the on-pixel ratio OPR by using the on-pixel ratio calculated based on the input image data IMG of each frame. Accordingly, the artificial neural network model 212 may continuously change, and as the display device 1200 is driven, a prediction accuracy of the artificial neural network model 212 may be improved.

The artificial neural network model 212 may apply prediction information IU of the on-pixel ratio to the memory device 500. The memory device 500 may receive the prediction information IU of the on-pixel ratio and update the first adjustment value look-up table LUT. For example, the updated first adjustment value AV1 may be determined based on the reference adjustment value RAV according to the on-pixel ratio. As shown in FIGS. 3 and 5, the memory device 500 may store information about the reference adjustment value RAV according to the on-pixel ratio.

In an embodiment, for example, initially, when the full black image, the full white image, and the full black image are sequentially applied in previous frames, it is assumed that the artificial neural network model 212 may be trained to predict the on-pixel ratio OPR of the current frame to 0% (i.e., the full black image), and then, when the full black image, the full white image, and the full black image are sequentially applied in previous frames, the artificial neural network model 212 may be trained to predict the on-pixel ratio OPR of the current frame to 100% (i.e., the full white image). In this case, the first adjustment value AV1 according to the full black image, the full white image, and the full black image may be updated from 0% to 30%.

The adjustment value determiner 222 may receive the input image data IMG[n-1] of the previous frame, and may determine the first adjustment value AV1 corresponding to the input image data IMG[n-1] of the previous frame (or, the input image data of previous frames) based on the first adjustment value look-up table LUT.

The luminance adjuster 232 may correct the input image data IMG[n] of the current frame based on the first adjustment value AV1. The driving controller 202 may generate the output image data OIMG based on the corrected input image data CIMG[n].

Figure 9:
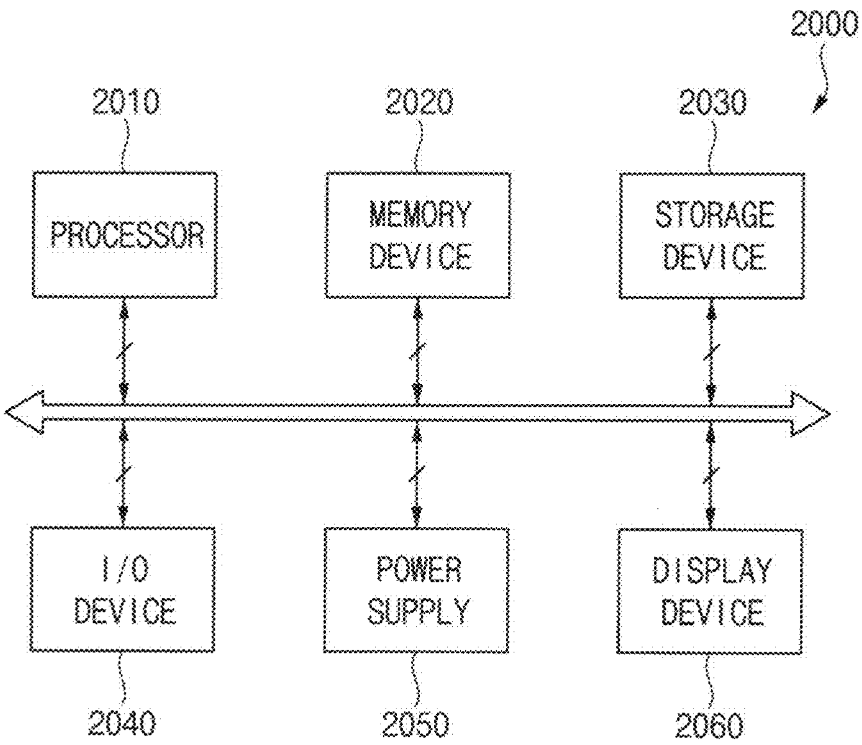
FIG. 9 is a block diagram showing an electronic device according to embodiments.
Figure 10:
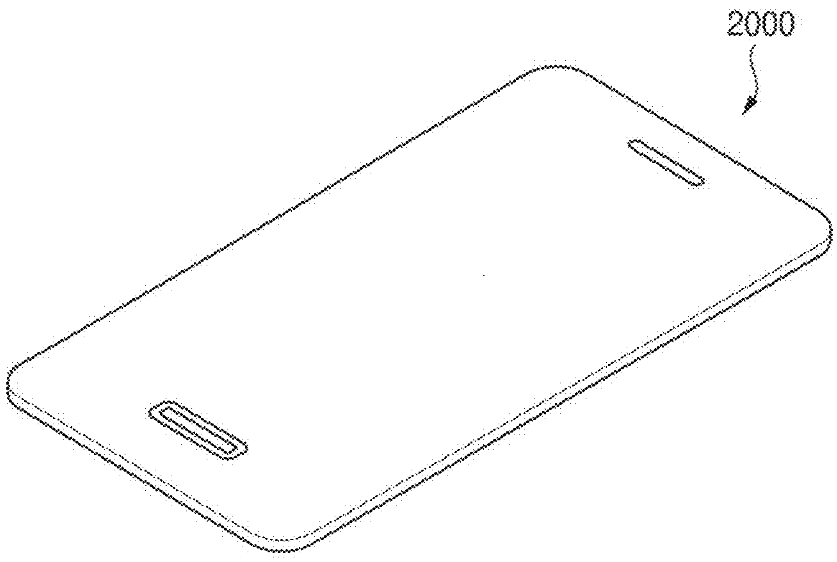
FIG. 10 is a diagram showing an example in which the electronic device of FIG. 9 is implemented as a smart phone.

FIG. 9 is a block diagram showing an electronic device according to embodiments, and FIG. 10 is a diagram showing an example in which the electronic device of FIG. 9 is implemented as a smart phone.

Referring to FIGS. 11 and 12, the electronic device 2000 may include a processor 2010, a memory device 2020, a storage device 2030, an input/output ("I/O") device 2040, a power supply 2050, and a display device 2060. Here, the display device 2060 may be the display device 1100 of FIG. 1. In addition, the electronic device 2000 may further include a plurality of ports for communicating with a video card, a sound card, a memory card, a universal serial bus ("USB") device, other electronic devices, etc. In an embodiment, as shown in FIG. 10, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display ("HMD") device, etc.

The processor 2010 may perform various computing functions. The processor 2010 may be a microprocessor, a central processing unit ("CPU"), an application processor ("AP"), etc. The processor 2010 may be coupled to other components via an address bus, a control bus, a data bus, etc. Further, the processor 2010 may be coupled to an extended bus such as a peripheral component interconnection ("PCI") bus.

The memory device 2020 may store data for operations of the electronic device 2000. For example, the memory device 2020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc.

The storage device 2030 may include a solid state drive ("SSD") device, a hard disk drive ("HDD") device, a CD-ROM device, etc.

The I/O device 2040 may include an input device such as a keyboard, a keypad, a mouse device, a touch pad, a touch screen, etc, and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit ("PMIC").

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may predict the on-pixel ratio of the current frame without input image data of the current frame, and may adjust the luminance of the current frame according to the predicted on-pixel ratio. Accordingly, it is possible to prevent an extreme change in the luminance from being visually recognized.

In an embodiment, the display device 2060 may include the display panel including the pixels, and the display panel driver driving the display panel, and the display panel driver may determine the predicted on-pixel ratio of the current frame based on the artificial neural network model and the input image data of the previous frame, determine the first adjustment value based on the predicted on-pixel ratio, and adjust the luminance of the current frame based on the first adjustment value. Since these are described above, duplicated description related thereto will not be repeated.

In another embodiment, the display device 2060 may include the display panel including the pixels, and the display panel driver driving the display panel, and the display panel driver may include the first adjustment value look-up table in which the first adjustment value according to the input image data of the previous frame and the artificial neural network model predicting the on-pixel ratio of the current frame based on the input image data of the previous frame, update the first adjustment value look-up table using the artificial neural network model, and adjust the luminance of the current frame based on the first adjustment value.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:

a display panel including pixels; and a display panel driver configured to drive the display panel, wherein the display panel driver is configured to determine a predicted on-pixel ratio of a current frame based on an artificial neural network model and input image data of a previous frame, to determine a first adjustment value based on the predicted on-pixel ratio, and to adjust a luminance of the current frame based on the first adjustment value, wherein the predicted on-pixel ratio is a ratio of a driving amount when the pixels are driven based on input image data of the current frame to a maximum driving amount when all of the pixels are driven based on a maximum grayscale value, wherein the artificial neural network model is configured to determine the predicted on-pixel ratio as probabilities for on-pixel ratios, wherein the display panel driver is configured to determine the first adjustment value by summing values generated by multiplying the probabilities of on-pixel ratios and predetermined reference adjustment values corresponding to the on-pixel ratios, respectively.

2. The display device of claim 1, wherein the artificial neural network model is corrected based on input image data of each frame.

3. The display panel driver of claim 1, wherein the display panel driver is configured to reduce the luminance of a first region of the display panel by the first adjustment value, to calculate a first on-pixel ratio of the first region based on the input image data of the current frame for the first region, and to reduce the luminance of a second region of the display panel different from the first region by a reference adjustment value corresponding to the first on-pixel ratio.

4. The display device of claim 3, wherein the display panel driver is configured to sequentially display an image in the first region and the second region in the current frame.

5. The display device of claim 3, wherein the display panel driver is configured to calculate a second on-pixel ratio of the first region and a second on-pixel ratio of the second region based on the input image data of the current frame for the first region and the second region, respectively, and to reduce the luminance of a third region of the display panel different from the first region and the second region by a reference adjustment value corresponding to the second on-pixel ratio.

6. The display device of claim 1, wherein the display panel driver is configured to reduce the luminance of a first region of the display panel by the first adjustment value, to calculate a first on-pixel ratio of the first region based on the input image data of the current frame for the first region, to calculate a first difference value between the first adjustment value and a reference adjustment value corresponding to the first on-pixel ratio, to determine a second adjustment value by summing the first adjustment value and a product of the first difference value and a first coefficient, to reduce the luminance of a second region of the display panel different from the first region by the second adjustment value, to calculate a second on-pixel ratio of the first region and a second on-pixel ratio of the second region based on the input image data of the current frame for the first region and the second region, respectively, to calculate a second difference value between the first adjustment value and the reference adjustment value corresponding to the second on-pixel ratio, to determine a third adjustment value by summing the first adjustment value with a product of the second difference value and a second coefficient, and to reduce the luminance of a third region of the display panel different from the first region and the second region by the third adjustment value.

7. The display device of claim 6, wherein the display panel driver sequentially displays an image in the first region, the second region, and the third region in the current frame.

8. The display device of claim 7, wherein the second coefficient is 1 when the third region includes a pixel row in which the image is displayed last in the current frame.

9. The display device of claim 7, wherein the first coefficient and the second coefficient are greater than 0 and less than or equal to 1, and wherein the second coefficient is greater than the first coefficient.

10. A display device comprising:

a display panel including pixels; and a display panel driver configured to drive the display panel, wherein the display panel driver includes a first adjustment value look-up table in which a first adjustment value according to input image data of a previous frame is included and an artificial neural network model which predicts an on-pixel ratio of a current frame based on the input image data of the previous frame, and is configured to update the first adjustment value look-up table using the artificial neural network model and to adjust a luminance of the current frame based on the first adjustment value, wherein the on-pixel ratio of the current frame is a ratio of a driving amount when the pixels are driven based on input image data of the current frame to a maximum driving amount when all of the pixels are driven based on a maximum grayscale value, the on-pixel ratio of the current frame being determined by the artificial neural network model, wherein the display panel driver is configured to reduce the luminance of a first region of the display panel by the first adjustment value, to calculate a first on-pixel ratio of the first region based on the input image data of the current frame for the first region, to calculate a first difference value between the first adjustment value and a reference adjustment value corresponding to the first on-pixel ratio, to determine a second adjustment value by summing the first adjustment value with a product of the first difference value and a first coefficient, and to reduce the luminance of a second region of the display panel different from the first region by the second adjustment value.

11. The display device of claim 10, wherein the artificial neural network model is corrected based on input image data of each frame.

12. The display panel driver of claim 10, wherein the display panel driver is configured to reduce the luminance of a first region of the display panel by the first adjustment value, to calculate a first on-pixel ratio of the first region based on the input image data of the current frame for the first region, and to reduce the luminance of a second region of the display panel different from the first region by a reference adjustment value corresponding to the first on-pixel ratio.

13. The display device of claim 12, wherein the display panel driver is configured to sequentially display an image in the first region and the second region in the current frame.

14. The display device of claim 12, wherein the display panel driver is configured to calculate a second on-pixel ratio of the first region and a second on-pixel ratio of the second region based on the input image data of the current frame for the first region and the second region, respectively, and to reduce the luminance of a third region of the display panel different from the first region and the second region by a reference adjustment value corresponding to the second on-pixel ratio.

15. The display device of claim 10, wherein the display panel driver is configured to calculate a second on-pixel ratio of the first region and a second on-pixel ratio of the second region based on the input image data of the current frame for the first region and the second region, respectively, to calculate a second difference value between the first adjustment value and the reference adjustment value corresponding to the second on-pixel ratio, to determine a third adjustment value by summing the first adjustment value with a product of the second difference value and a second coefficient, and to reduce the luminance of a third region of the display panel different from the first region and the second region by the third adjustment value.

16. The display device of claim 15, wherein the display panel driver sequentially displays an image in the first region, the second region, and the third region in the current frame.

17. The display device of claim 16, wherein the second coefficient is 1 when the third region includes a pixel row in which the image is displayed last in the current frame.

18. The display device of claim 16, wherein the first coefficient and the second coefficient are greater than 0 and less than or equal to 1, and wherein the second coefficient is greater than the first coefficient.

* * * * *